United States Patent
Wang (10) Patent No.: US 12,278,367 B2
(45) Date of Patent: *Apr. 15, 2025

(54) POSITIVE ELECTRODE ACTIVE MATERIAL, AND ELECTROCHEMICAL APPARATUS AND ELECTRONIC APPARATUS USING SAME

(71) Applicant: Ningde Amperex Technology Limited, Fujian (CN)

(72) Inventor: Liang Wang, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,567

(22) Filed: Sep. 22, 2023

(65) Prior Publication Data
US 2024/0021815 A1    Jan. 18, 2024

Related U.S. Application Data

(63) Continuation of application No. PCT/CN2021/107115, filed on Jul. 19, 2021.

(30) Foreign Application Priority Data

Mar. 25, 2021  (CN) .......................... 202110319270.9

(51) Int. Cl.
   *H01M 4/525*    (2010.01)
   *H01M 4/02*     (2006.01)
   (Continued)

(52) U.S. Cl.
   CPC ........... *H01M 4/525* (2013.01); *H01M 4/364* (2013.01); *H01M 4/382* (2013.01); *H01M 4/463* (2013.01);
   (Continued)

(58) Field of Classification Search
   CPC ...... H01M 4/364; H01M 4/382; H01M 4/463; H01M 4/525; H01M 10/0525; H01M 2004/028
   See application file for complete search history.

(56) References Cited

U.S. PATENT DOCUMENTS

| 8,852,452 B2 | 10/2014 | Paulsen et al. |
| 10,784,508 B2 | 9/2020 | Ni et al. |

(Continued)

FOREIGN PATENT DOCUMENTS

| CN | 103811765 A | 5/2014 |
| CN | 107681123 A | 2/2018 |

(Continued)

OTHER PUBLICATIONS

Liu, Qi, et al. "Approaching the capacity limit of lithium cobalt oxide in lithium ion batteries via lanthanum and aluminium doping." Nature Energy 3.11 (2018): 936-943 (Year: 2018).*

(Continued)

*Primary Examiner* — Ekandra S. Miller-Cruz
*Assistant Examiner* — Jared Hansen
(74) *Attorney, Agent, or Firm* — XSENSUS LLP (57) ABSTRACT

A positive electrode active material, where a surface region of the positive electrode active material includes a specific content of element aluminum. The positive electrode material of this application helps to improve the impedance, cycling performance, and high-temperature storage performance of electrochemical apparatuses under high-voltage operating conditions.

20 Claims, 2 Drawing Sheets

(51) Int. Cl.
  *H01M 4/36* (2006.01)
  *H01M 4/38* (2006.01)
  *H01M 4/46* (2006.01)
  *H01M 10/0525* (2010.01)

(52) U.S. Cl.
  CPC .. *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 11,031,626 B2* | 6/2021 | Li | H01M 4/505 |
| 2005/0014065 A1 | 1/2005 | Jung et al. | |
| 2005/0130042 A1* | 6/2005 | Liu | H01M 4/366 |
| | | | 429/223 |
| 2012/0164525 A1* | 6/2012 | Endoh | H01M 4/485 |
| | | | 429/188 |
| 2012/0261610 A1 | 10/2012 | Paulsen et al. | |
| 2015/0243971 A1* | 8/2015 | Cho | H01M 4/0471 |
| | | | 429/231.1 |
| 2017/0018772 A1* | 1/2017 | Satow | H01M 4/525 |
| 2017/0187035 A1* | 6/2017 | Yanagihara | H01M 4/505 |
| 2018/0337401 A1 | 11/2018 | Ni et al. | |
| 2021/0020902 A1* | 1/2021 | Yoo | H01M 4/525 |
| 2021/0202940 A1* | 7/2021 | Li | C01B 25/45 |
| 2022/0216481 A1* | 7/2022 | Zhang | H01M 4/628 |
| 2022/0310998 A1* | 9/2022 | Zhou | H01M 4/366 |

FOREIGN PATENT DOCUMENTS

| | | |
|---|---|---|
| CN | 108269997 A | 7/2018 |
| CN | 108288692 A | 7/2018 |
| CN | 108649205 A | 10/2018 |
| CN | 108963197 A | 12/2018 |
| CN | 105789600 B | 5/2019 |
| CN | 110120497 A | 8/2019 |
| CN | 110729477 A | 1/2020 |
| CN | 111106328 A | 5/2020 |
| CN | 111302407 A | 6/2020 |
| CN | 112467078 A | 3/2021 |
| CN | 113078309 A | 7/2021 |
| JP | 2001-076725 A | 3/2001 |
| JP | 2008226495 A | 9/2008 |
| JP | 2013179063 A | 9/2013 |
| JP | 2015144108 A | 8/2015 |
| JP | 2016-139583 A | 8/2016 |

OTHER PUBLICATIONS

Li, Yong-Chun, et al. "Synergy of doping and coating induced heterogeneous structure and concentration gradient in Ni-rich cathode for enhanced electrochemical performance." Journal of Power Sources 423 (2019): 144-151 (Year: 2019).*

International Search Report and Written Opinion mailed on Nov. 3, 2021, received for PCT Application PCT/CN2021/107115, filed on Jul. 19, 2021, 11 pages including English Translation.

First Office Action mailed on Mar. 3, 2022, received for CN Application 202110319270.9, 12 pages including English Translation.

Second Office Action mailed on Sep. 5, 2022, received for CN Application 202110319270.9, 14 pages including English Translation.

Notification to Grant Patent Right for Invention mailed May 9, 2023, in Chinese Application No. 202110319270.9, 6 pages. (with English Translation).

Notice of Reasons for Refusal mailed Nov. 26, 2024, in Japanese Application No. 2023557768, 6 pages including English translation.

* cited by examiner

POSITIVE ELECTRODE ACTIVE MATERIAL, AND ELECTROCHEMICAL APPARATUS AND ELECTRONIC APPARATUS USING SAME

CROSS-REFERENCE TO RELATED APPLICATIONS

This application is a continuation application of PCT International Application No. PCT/CN2021/107115, filed on Jul. 19, 2021, which claims priority to Chinese Patent Application S.N. 202110319270.9, filed on Mar. 25, 2021, the contents of each are incorporated herein by reference in its entirety.

TECHNICAL FIELD

This application relates to the field of energy storage, and in particular, to a positive electrode active material, and an electrochemical apparatus and electronic apparatus using same.

BACKGROUND

Electrochemical apparatuses (for example, lithium-ion batteries) have been widely used in consumer electronic products such as notebook computers, mobile phones, handheld game consoles, tablet computers, mobile power supplies, and drones due to their advantages such as high energy density, high safety, no memory effect, and long operating life. With the increasing demand for such electronic products, increasingly high requirements have been imposed on electrochemical apparatuses, including their portability, capacity, cycling performance, storage performance, operating life, fast charging performance, and the like. How to improve the fast charging performance of electrochemical apparatuses has become one of the key research directions. Developing new types of positive electrode active materials is one of the ways to improve the fast charging performance of electrochemical apparatuses. However, traditional positive electrode active materials still face many issues under high-voltage operating conditions, which greatly limits their applications.

In view of this, it is indeed necessary to provide a positive electrode active material with improved high-voltage operating performance.

SUMMARY

This application provides a positive electrode active material suitable for use under high-voltage operating conditions in an attempt to solve at least one problem present in the related field to at least some extent.

According to one aspect of this application, this application provides a positive electrode active material, where at least a part of the surface region of the positive electrode active material includes element aluminum, and based on the weight of the positive electrode active material, a percentage of element aluminum in the surface region is A wt %, A is 0.01 to 1.

According to an embodiment of this application, the inner region of the positive electrode active material includes element aluminum, and based on the weight of the positive electrode active material, a percentage of element aluminum in the inner region is $A_1$ wt %, $A_1$ satisfying at least one of the following conditions: (a) $A_1$ is 0.05 to 2; (b) $A_1>A$; or (c) $1<A_1/A<10$.

According to an embodiment of this application, at least a part of the surface region of the positive electrode active material further includes element lanthanum, and based on the weight of the positive electrode active material, a percentage of element lanthanum in the surface region is B wt %, B satisfying at least one of the following conditions: (d) B is 0.01 to 0.8; or (e) $0.01 \leq B/A \leq 0.8$.

According to an embodiment of this application, at least a part of the surface region of the positive electrode active material further includes at least one of elements lithium, cobalt, nickel, manganese, magnesium, titanium, zirconium, fluorine, or yttrium.

According to an embodiment of this application, the inner region of the positive electrode active material includes element lanthanum, and based on the weight of the positive electrode active material, a percentage of element lanthanum in the inner region is D wt %, D satisfying at least one of the following conditions: (0 D is 0.01 to (g) B>D; or (h) $1<B/D<10$.

According to an embodiment of this application, the positive electrode active material includes first particles and second particles, and a median particle size of the first particles is greater than a median particle size of the second particles.

According to an embodiment of this application, the positive electrode active material satisfies at least one of the following conditions: (i) the Dv50 of the first particles is 10 μm to 15 μm; (j) the Dv99 of the first particles is 20 μm to 30 μm; (k) the Dv50 and Dv99 of the first particles satisfying: $1.5 \leq Dv99/Dv50 < 3$; (l) the Dv50' of the second particles is 2 μm to 6 μm; or (m) the Dv50 of the first particles and the Dv50' of the second particles satisfying: $2 \leq Dv50/Dv50' < 8$.

According to an embodiment of this application, the second particles include secondary particles, and a median particle size of primary particles forming the secondary particles is 0.1 μm to 3 μm.

According to an embodiment of this application, the second particles are polycrystalline particles.

According to an embodiment of this application, a weight percentage of element lanthanum in the first particles is less than a weight percentage of element lanthanum in the second particles.

According to an embodiment of this application, the weight percentage of element lanthanum in the first particles is E wt %, and the weight percentage of element lanthanum in the second particles is F wt %, where E is 0.01 to 0.6, and F is 0.01 to 0.9. According to an embodiment of this application, $0.5 \leq E/F < 1$.

According to an embodiment of this application, in XRD test, a peak intensity ratio of the highest peak in the range of 23.0°-24.0° to the highest peak in the range of 32.5°-33.5° for the positive electrode active material is 0.6 to 1.5.

According to an embodiment of this application, the positive electrode active material includes at least one of cobalt lithium oxide, manganese lithium oxide, or nickel cobalt manganese lithium oxide.

According to another aspect of this application, this application provides a method for preparing the positive electrode active material described in this application, including:

step S1: sintering a mixture including precursor materials of a positive electrode active material at a temperature of 600-1500° C. to obtain a primary positive electrode active material X; and step S2: sintering raw materials including the primary positive electrode active material X and a compound containing element aluminum at a temperature of 600-1000° C. to obtain a positive electrode active material.

According to another aspect of this application, this application further provides a method for preparing the positive electrode active material described in this application, including:

step S1-1: sintering a first mixture including precursor materials of a first positive electrode active material at a temperature of T1 to obtain a first primary positive electrode active material X1;

step S2-1: sintering a first raw material including the first primary positive electrode active material X1 and a first compound containing element aluminum at a temperature of T1' to obtain first particles;

step S1-2: sintering a second mixture including precursor materials of a second positive electrode active material at a temperature of T2 to obtain a second primary positive electrode active material X2;

step S2-2: sintering a second raw material including the second primary positive electrode active material X2 and a second compound containing element aluminum at a temperature of T2' to obtain second particles; and step S3: mixing the first particles and the second particles to obtain the positive electrode active material.

According to an embodiment of this application, in at least one of steps S1, S2, S1-1, S2-1, S1-2, or S2-2, a sintering time is 4-12 hours.

According to an embodiment of this application, in the step S1-1, the temperature T1 is 800-1150° C.

According to an embodiment of this application, in the step S1-1, the sintering time is 8-24 hours.

According to an embodiment of this application, in the step S2-1, the temperature T1' is 700-1000° C.

According to an embodiment of this application, in the step S2-1, the sintering time is 4-12 hours.

According to an embodiment of this application, in the step S1-2, the temperature T2 is 800-1050° C.

According to an embodiment of this application, in the step S1-2, the sintering time is 8-24 hours.

According to an embodiment of this application, in the step S2-2, the temperature T2' is 600-950° C.

According to an embodiment of this application, in the step S2-2, the sintering time is 4-12 hours.

According to an embodiment of this application, at least one of the mixture, the first mixture, or the second mixture optionally includes a compound containing element aluminum, magnesium, titanium, zirconium, or yttrium.

According to an embodiment of this application, at least one of the mixture, the first mixture, or the second mixture further includes a compound containing element aluminum.

According to an embodiment of this application, at least one of the mixture, the first mixture, or the second mixture includes element aluminum and optionally includes a compound containing element magnesium, titanium, zirconium, or yttrium.

According to an embodiment of this application, at least one of the raw material, the first raw material, or the second raw material optionally includes at least one element of nickel, manganese, magnesium, titanium, zirconium, fluorine, or yttrium.

According to an embodiment of this application, at least one of the raw material, the first raw material, or the second raw material optionally includes a compound containing element nickel, manganese, magnesium, titanium, zirconium, fluorine, or yttrium.

According to an embodiment of this application, at least one of the mixture, the first mixture, or the second mixture further includes a compound containing element lanthanum.

According to an embodiment of this application, based on weight of the mixture, the first mixture, or the second mixture, a percentage of element lanthanum is 0.01% to 5%.

According to an embodiment of this application, at least one of the mixture, the first mixture, or the second mixture further includes a compound containing element M, the element M including at least one of the following elements: lithium, cobalt, nickel, manganese, magnesium, titanium, zirconium, fluorine, yttrium, niobium, boron, molybdenum, vanadium, or cerium.

According to an embodiment of this application, at least one of the mixture, the first mixture, or the second mixture further includes a compound containing element M, the element M including lithium, cobalt, and at least one of the following elements: nickel, manganese, magnesium, titanium, zirconium, fluorine, yttrium, niobium, boron, molybdenum, vanadium, or cerium.

According to an embodiment of this application, at least one of the mixture, the first mixture, or the second mixture further includes a compound containing element M, the element M including at least one of the following elements: magnesium, titanium, zirconium, fluorine, yttrium, niobium, boron, molybdenum, vanadium, or cerium.

According to an embodiment of this application, at least one of the raw material, the first raw material, or the second raw material further includes a compound containing element M, the element M including at least one of the following elements: lithium, cobalt, nickel, manganese, magnesium, titanium, zirconium, fluorine, yttrium, niobium, boron, molybdenum, vanadium, or cerium.

According to an embodiment of this application, at least one of the raw material, the first raw material, or the second raw material further includes a compound containing element M, the element M including lithium, cobalt, and at least one of the following elements: nickel, manganese, magnesium, titanium, zirconium, fluorine, yttrium, niobium, boron, molybdenum, vanadium, or cerium.

According to an embodiment of this application, the compound containing element M is at least one of an oxide of element M, a hydroxide of element M, a carbonate of element M, a phosphate of element M, or a fluoride of element M.

According to an embodiment of this application, at least one of the precursor materials of the positive electrode active material, the precursor materials of the first positive electrode active material, or the precursor materials of the second positive electrode active material includes a compound containing element cobalt and a lithium salt.

According to an embodiment of this application, the compound containing element cobalt includes at least one of cobalt oxide or cobalt hydroxide.

According to an embodiment of this application, the lithium salt includes at least one of lithium carbonate, lithium oxide, or lithium hydroxide.

According to an embodiment of this application, a molar ratio of the compound containing element cobalt to the lithium salt is 0.90:1 to 1.1:1.

According to an embodiment of this application, in the step S3, the first particles and the second particles are mixed at a mass ratio of 1:9-9:1 to obtain the positive electrode active material.

According to another aspect of this application, this application provides an electrochemical apparatus including a positive electrode, a negative electrode, and an electrolyte, where the positive electrode includes the positive electrode active material according to an embodiment of this application.

According to still another aspect of this application, this application provides an electronic apparatus including the electrochemical apparatus according to an embodiment of this application.

Additional aspects and advantages of this application are partially described and presented in subsequent descriptions, or explained by implementation of some embodiments of this application.

BRIEF DESCRIPTION OF DRAWINGS

To describe some embodiments of this application, the following briefly describes the accompanying drawings required for describing some embodiments of this application or the prior art. Apparently, the accompanying drawings described below are merely some embodiments of this application. Persons skilled in the art can still derive drawings for other embodiments from structures shown in these accompanying drawings without creative efforts.

DETAILED DESCRIPTION

Some embodiments of this application are described in detail below. Some embodiments of this application should not be construed as limitations on this application.

The term "about" used herein is intended to describe and represent small variations. When used in combination with an event or a circumstance, the term may refer to an example in which the event or circumstance occurs precisely or an example in which the event or circumstance occurs very closely. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

In Description of Embodiments and Claims, a list of items preceded by the term "at least one of" may mean any combination of the listed items. For example, if items A and B are listed, the phrase "at least one of A and B" means only A; only B; or A and B. In another example, if items A, B, and C are listed, the phrase "at least one of A, B, and C" means only A; only B; only C; A and B (exclusive of C); A and C (exclusive of B); B and C (exclusive of A); or all of A, B, and C. The item A may contain a single element or a plurality of elements. The item B may contain a single element or a plurality of elements. The item C may contain a single element or a plurality of elements.

Positive Electrode

A positive electrode includes a positive electrode current collector and a positive electrode material disposed on the positive electrode current collector. The positive electrode material includes a positive electrode active material.

With the wide application of electrochemical apparatuses (for example, lithium-ion batteries), increasingly high requirements have been imposed on performance of the electrochemical apparatuses, especially fast charging performance. Using high-voltage charging is one of the ways to increase charging speed and shorten charging time. However, under high-voltage operating conditions, conventional electrochemical apparatuses face many challenges, such as degraded cycling performance and storage performance, increased impedance, shortened service life, and reduced energy density. One of the reasons for these problems is that under high-voltage conditions, the surface of the positive electrode active material is prone to oxidation-reduction decomposition. Surface properties of positive electrode active materials can typically be modified by surface coating, thereby improving high-voltage fast charging performance of electrochemical apparatuses. However, a challenge of surface coating lies in the determination of which material to choose as the coating layer, which method to use for coating, and how to determine the coating amount.

To solve these problems, in this application, a specific content of element aluminum is provided in the surface of the positive electrode active material in a doping manner, thereby improving the impedance, cycling performance, and high-temperature storage performance of the electrochemical apparatuses under high-voltage operating conditions. Specifically, this application provides a positive electrode active material, where at least a part of the surface region of the positive electrode active material includes element aluminum, and based on the weight of the positive electrode active material, a percentage of element aluminum in the surface region is A wt %, A is 0.01 to 1. In some embodiments, A is 0.2 to 0.8. In some embodiments, A is 0.3 to 0.6. In some embodiments, A is 0.01, 0.02, 0.04, 0.06, 0.09, 0.1, 0.2, 0.3, 0.4, 0.5, 0.6, 0.7, 0.8, 0.9, or 1, or falls within a range defined by any two of the foregoing values.

As described herein, the "surface region" of the positive electrode active material refers to the region from the outermost surface of the positive electrode active material particle toward the center direction within a range less than or equal to 200 nm.

With the surface region of the positive electrode active material including the foregoing percentage of element aluminum, the electrochemical apparatuses can have significantly reduced impedance under high-voltage operating conditions as well as significantly improved cycling performance and high-temperature storage performance.

In some embodiments, the inner region of the positive electrode active material includes element aluminum, and based on the weight of the positive electrode active material, a percentage of element aluminum in the inner region is $A_1$ wt %, $A_1$ satisfying at least one of the following conditions: (a) $A_1$ is 0.05 to 2; (b) $A_1 > A$; or (c) $1 < A_1/A < 10$. As described herein, the "inner region" of the positive electrode active material refers to the region other than the surface region of the positive electrode active material particle.

In some embodiments, $A_1$ is 0.05 to 1.5. In some embodiments, $A_1$ is 0.07 to 1.2. In some embodiments, $A_1$ is 0.1 to 1.0. In some embodiments, $A_1$ is 0.2 to 0.9. In some embodiments, $A_1$ is 0.05, 0.06, 0.09, 0.1, 0.2, 0.3, 0.4, 0.5, 0.6, 0.7, 0.8, 0.9, 1.0, 1.1, 1.2, 1.5, 1.8, or 2, or falls within a range defined by any two of the foregoing values.

In some embodiments, $A_1 > A$.

In some embodiments, $2 \leq A_1/A \leq 8$. In some embodiments, $2.5 \leq A_1/A \leq 5$. In some embodiments, $A_1/A$ is 1.5, 2, 2.5, 3, 3.5, 4, 4.5, 5, 5.5, 6, 6.5, 7, 7.5, 8, 8.5, 9, or 9.5, or falls within a range defined by any two of the foregoing values.

In some embodiments, at least a part of the surface region of the positive electrode active material further includes element lanthanum, and based on the weight of the positive electrode active material, a percentage of element lanthanum in the surface region is B wt %, B satisfying at least one of the following conditions: (d) B is to 0.8; or (e) $0.01 \leq B/A \leq 0.8$.

In some embodiments, B is 0.01 to 0.6. In some embodiments, B is 0.02 to 0.5. In some embodiments, B is 0.05 to 0.3. In some embodiments, B is 0.05 to 0.2. In some embodiments, B is 0.01, 0.03, 0.05, 0.07, 0.1, 0.2, 0.3, 0.4, 0.5, 0.6, 0.7, or 0.8, or falls within a range defined by any two of the foregoing values.

In some embodiments, $0.02 \leq B/A \leq 0.6$. In some embodiments, $0.03 \leq B/A \leq 0.5$. In some embodiments, $0.05 \leq B/A \leq 0.3$. In some embodiments, $0.05 \leq B/A \leq 0.2$. In some embodiments, B/A is 0.01, 0.03, 0.05, 0.07, 0.1, 0.2, 0.3, 0.4, 0.5, 0.6, 0.7, or 0.8, or falls within a range defined by any two of the foregoing values.

With the surface region of the positive electrode active material including element lanthanum that satisfies the foregoing conditions, the impedance, cycling performance, and high-temperature storage performance of the electrochemical apparatuses under high-voltage operating conditions can be further improved.

In some embodiments, at least a part of the surface region of the positive electrode active material further includes at least one of elements lithium, cobalt, nickel, manganese, magnesium, titanium, zirconium, fluorine, or yttrium. In some embodiments, at least a part of the surface region of the positive electrode active material further includes lithium, cobalt, and at least one of elements nickel, manganese, magnesium, titanium, zirconium, fluorine, or yttrium. In some embodiments, at least a part of the surface region of the positive electrode active material further includes at least one of elements magnesium, titanium, zirconium, fluorine, or yttrium. With the surface region of the positive electrode active material including the foregoing element(s), the impedance, cycling performance, and high-temperature storage performance of the electrochemical apparatuses under high-voltage operating conditions can be further improved.

In some embodiments, the inner region of the positive electrode active material includes element lanthanum, and based on the weight of the positive electrode active material, a percentage of element lanthanum in the inner region is D wt %, D satisfying at least one of the following conditions: (0 D is 0.01 to 0.4; (g) B>D; or (h) 1<B/D<10.

In some embodiments, D is 0.01 to 0.3. In some embodiments, D is 0.03 to 0.2. In some embodiments, D is 0.01, 0.03, 0.05, 0.07, 0.1, 0.15, 0.2, 0.25, 0.3, 0.35, or 0.4, or falls within a range defined by any two of the foregoing values.

In some embodiments, 1<B/D<5. In some embodiments, B/D is 1.2, 1.5, 2, 2.5, 3, 3.5, 4, 4.5, 5, 5.5, 6, 6.5, 7, 7.5, 8, 8.5, 9, or 9.5, or falls within a range defined by any two of the foregoing values.

With the inner region of the positive electrode active material including element lanthanum that satisfies the foregoing conditions, the impedance, cycling performance, and high-temperature storage performance of the electrochemical apparatuses under high-voltage operating conditions can be further improved.

In some embodiments, the positive electrode active material includes first particles and second particles, and a median particle size of the first particles is greater than a median particle size of the second particles. In some embodiments, the first particles include primary particles. In some embodiments, the second particles are secondary particles. In some embodiments, the second particles are polycrystalline particles. Combining use of larger-sized primary particles and smaller-sized secondary particles helps to increase the compacted density of the positive electrode active material layer and further improves the impedance, cycling performance, and high-temperature storage performance of electrochemical apparatuses under high-voltage operating conditions.

In some embodiments, the positive electrode active material satisfies at least one of the following conditions: (i) the Dv50 of the first particles is 10 μm to 15 μm; (j) the Dv99 of the first particles is 20 μm to 30 μm; (k) the Dv50 and Dv99 of the first particles satisfying: $1.5 \leq Dv99/Dv50 < 3$; (l) the Dv50' of the second particles is 2 μm to 6 μm; or (m) the Dv50 of the first particles and the Dv50' of the second particles satisfying: $2 \leq Dv50/Dv50' < 8$.

In some embodiments, the Dv50 of the first particles is 12 μm to 14 μm. In some embodiments, the Dv50 of the first particles is 10 μm, 11 μm, 12 μm, 13 μm, 14 μm, or 15 μm, or falls within a range defined by any two of the foregoing values.

In some embodiments, the Dv99 of the first particles is 22 μm to 28 μm. In some embodiments, the Dv99 of the first particles is 24 μm to 26 μm. In some embodiments, the Dv90 of the first particles is 20 μm, 21 μm, 22 μm, 23 μm, 24 μm, 25 μm, 26 μm, 27 μm, 28 μm, 29 μm, or 30 μm, or falls within a range defined by any two of the foregoing values.

In some embodiments, the Dv50 and Dv99 of the first particles satisfy $2.0 \leq Dv99/Dv50 < 2.6$. In some embodiments, the Dv99/Dv50 of the first particles is 1.5, 1.6, 1.7, 1.8, 1.9, 2.0, 2.2, 2.3, 2.4, 2.5, 2.6, 2.7, 2.8, or 2.9, or falls within a range defined by any two of the foregoing values.

In some embodiments, the Dv50' of the second particles is 3 μm to 5 μm. In some embodiments, the Dv50' of the second particles is 2 μm, 3 μm, 4 μm, 5 μm, or 6 μm, or falls within a range defined by any two of the foregoing values.

In some embodiments, the Dv50 of the first particles and the Dv50' of the second particles satisfy $2 \leq Dv50/Dv50' \leq 7$. In some embodiments, the ratio Dv50/Dv50' of the Dv50 of the first particles to the Dv50' of the second particles is 2, 3, 4, 5, 6, or 7, or falls within a range defined by any two of the foregoing values.

With the particle sizes of the first particles and second particles in the positive electrode active material satisfying the foregoing conditions, the impedance, cycling performance, and high-temperature storage performance of the electrochemical apparatuses under high-voltage operating conditions can be further improved.

In some embodiments, the second particles include secondary particles, and a median particle size of primary particles forming the secondary particles is 0.1 μm to 3 μm. In some embodiments, a median particle size of primary particles forming the secondary particles is 0.5 μm to 2 μm. In some embodiments, a median particle size of primary particles forming the secondary particles is 1 μm to 1.5 μm. In some embodiments, a median particle size of primary particles forming the secondary particles 0.1 μm, 0.5 μm, 1 μm, 1.5 μm, 2 μm, 2.5 μm, or 3 μm, or falls within a range defined by any two of the foregoing values. When the secondary particles in the second particles are formed by the primary particles with the foregoing median particle size, the impedance, cycling performance, and high-temperature storage performance of the electrochemical apparatuses under high-voltage operating conditions can be further improved.

In some embodiments, the particle size of the primary particles in the second particles can be controlled by controlling the particle size of the raw material or by adjusting the sintering temperature and/or sintering time during the preparation of the secondary particles.

In some embodiments, a weight percentage of element lanthanum in the first particles is less than a weight percentage of element lanthanum in the second particles. In some embodiments, the weight percentage of element lanthanum in the first particles is E wt %, and the weight percentage of element lanthanum in the second particles is F wt %, where E is 0.01 to 0.6, and F is 0.01 to 0.9. In some embodiments, E is 0.01 to 0.5. In some embodiments, E is 0.05 to 0.4. In some embodiments, E is 0.1 to 0.2. In some embodiments, E is 0.01, 0.05, 0.1, 0.2, 0.3, 0.4, 0.5, or 0.6, or falls within a range defined by any two of the foregoing values. In some embodiments, F is 0.01 to 0.4. In some embodiments, F is 0.05 to 0.3. In some embodiments, F is 0.1 to 0.2. In some embodiments, F is 0.01, 0.05, 0.1, 0.2, 0.3, 0.4, or 0.5, or falls within a range defined by any two of the foregoing values. With the percentages of element lanthanum in the first particles and second particles within the foregoing ranges, the impedance, cycling performance, and high-temperature storage performance of the electrochemical apparatuses under high-voltage operating conditions can be further improved.

In some embodiments, $0.5 \leq E/F < 1$. In some embodiments, $0.6 \leq E/F \leq 0.9$. In some embodiments, E/F is 0.5, 0.6, 0.7, 0.8, or 0.9, or falls within a range defined by any two of the foregoing values. With the percentages of element lanthanum in the first particles and second particles satisfying the foregoing conditions, the impedance, cycling performance, and high-temperature storage performance of the electrochemical apparatuses under high-voltage operating conditions can be further improved.

In some embodiments, in XRD test, a peak intensity ratio of the highest peak in the range of 23.0°-24.0° to the highest peak in the range of 32.5°-33.5° for the positive electrode active material is 0.6 to 1.5. The emergence of new characteristic peaks in the ranges of 23.0°-24.0° and 32.5°-33.5° for the positive electrode active material indicates the presence of a new phase in the positive electrode active material.

In some embodiments, the positive electrode active material includes at least one of cobalt lithium oxide, manganese lithium oxide, or nickel cobalt manganese lithium oxide.

In some embodiments, the cobalt lithium oxide includes $Li_aCo_bM_cM2_dO_2$, where $0.90 \leq a \leq 1.2$, $0.9 \leq b < 1$, $0 < c \leq 0.1$, $0 \leq d < 0.1$, M includes aluminum and at least one of lanthanum, nickel, manganese, magnesium, titanium, zirconium, fluorine, tungsten, boron, or yttrium, and M2 includes at least one of sodium, iron, silicon, zinc, or phosphorus.

In some embodiments, the manganese lithium oxide includes $Li_aMn_bM_cM2_dO_2$, where $0.90 \leq a \leq 1.8$, $0.9 \leq b < 1$, $0 < c \leq 0.1$, $0 \leq d < 0.1$, M includes aluminum and at least one of lanthanum, nickel, manganese, magnesium, titanium, zirconium, fluorine, tungsten, boron, or yttrium, and M2 includes at least one of sodium, iron, silicon, zinc, or phosphorus.

In some embodiments, the nickel cobalt manganese lithium oxide includes $Li_aNi_bCo_cMn_dMeO_2$, where $0.90 \leq a \leq 1.2$, $0 < b \leq 0.95$, $0 < c \leq 0.4$, $0 < d \leq 0.4$, $0 < e \leq 0.1$, and M includes aluminum and at least one of lanthanum, magnesium, titanium, zirconium, fluorine, tungsten, boron, or yttrium.

In some embodiments, the molar content of element lithium in the positive electrode active material may decrease in the formation process of the electrochemical apparatus, leading to a decrease in the molar proportion of element lithium.

In some embodiments, the positive electrode material further includes a binder and optionally further includes a positive electrode conductive material.

The binder can enhance binding between particles of the positive electrode active material and binding between the positive electrode active material and the positive electrode current collector. Non-limiting examples of the binder include polyvinyl alcohol, hydroxypropyl cellulose, diacetyl cellulose, polyvinyl chloride, carboxylated polyvinyl chloride, polyvinyl fluoride, polyvinylpyrrolidone, polyurethane, polytetrafluoroethylene, poly(1,1-difluoroethylene), polyethylene, polypropylene, styrene-butadiene rubber, acrylic styrene-butadiene rubber, epoxy resin, nylon, and the like.

In some embodiments, the positive electrode material further includes a positive electrode conductive material, thereby imparting conductivity to the electrode. The positive electrode conductive material may include any conductive material, provided that such conductive material causes no chemical change. Non-limiting examples of the positive electrode conductive material include a carbon-based material (for example, natural graphite, artificial graphite, carbon black, acetylene black, Ketjen black, and carbon fibers), a metal-based material (for example, metal powder and metal fibers, including copper, nickel, aluminum, and silver), a conductive polymer (for example, a polyphenylene derivative), and a mixture thereof.

In some embodiments, the positive electrode current collector may be but is not limited to aluminum (Al).

This application further provides a method for preparing the positive electrode active material described in this application, including: step S1: sintering a mixture including precursor materials of a positive electrode active material at a temperature of 600-1500° C. to obtain a primary positive electrode active material X; and step S2: sintering raw materials including the primary positive electrode active material X and a compound containing element aluminum at a temperature of 600-1000° C. to obtain a positive electrode active material. When the primary positive electrode active material X is added with a compound containing element aluminum and sintered, thermal diffusion of element aluminum occurs at a specific high temperature, resulting in part of element aluminum being formed in the surface region of the positive electrode active material.

This application further provides a method for preparing the positive electrode active material described in this application, including:

step S1-1: sintering a first mixture including precursor materials of a first positive electrode active material at a temperature of T1 to obtain a first primary positive electrode active material X1;

step S2-1: sintering a first raw material including the first primary positive electrode active material X1 and a first compound containing element aluminum at a temperature of T1' to obtain first particles;

step S1-2: sintering a second mixture including precursor materials of a second positive electrode active material at a temperature of T2 to obtain a second primary positive electrode active material X2;

step S2-2: sintering a second raw material including the second primary positive electrode active material X2 and a second compound containing element aluminum at a temperature of T2' to obtain second particles; and step S3: mixing the first particles and the second particles to obtain the positive electrode active material.

In some embodiments, in at least one of steps S1, S2, S1-1, S2-1, S1-2, or S2-2, a sintering time is 4-12 hours.

In some embodiments, in the step S1-1, the temperature T1 is 800-1150° C.

In some embodiments, in the step S1-1, the sintering time is 8-24 hours.

In some embodiments, in the step S2-1, the temperature T1' is 700-1000° C.

In some embodiments, in the step S2-1, the sintering time is 4-12 hours.

In some embodiments, in the step S1-2, the temperature T2 is 800-1050° C.

In some embodiments, in the step 51-2, the sintering time is 8-24 hours.

In some embodiments, in the step S2-2, the temperature T2' is 600-950° C.

In some embodiments, in the step S2-2, the sintering time is 4-12 hours.

In some embodiments, at least one of the mixture, the first mixture, or the second mixture optionally includes a compound containing element aluminum, magnesium, titanium, zirconium, or yttrium.

In some embodiments, at least one of the mixture, the first mixture, or the second mixture further includes a compound containing element aluminum.

In some embodiments, at least one of the mixture, the first mixture, or the second mixture includes element aluminum and optionally includes a compound containing element magnesium, titanium, zirconium, or yttrium.

In some embodiments, at least one of the raw material, the first raw material, or the second raw material optionally includes at least one element of nickel, manganese, magnesium, titanium, zirconium, fluorine, or yttrium.

In some embodiments, at least one of the raw material, the first raw material, or the second raw material optionally includes a compound containing element nickel, manganese, magnesium, titanium, zirconium, fluorine, or yttrium.

In some embodiments, at least one of the mixture, the first mixture, or the second mixture further includes a compound containing element lanthanum. Element lanthanum tends to undergo thermal diffusion towards the particle surface at a specific elevated temperature, resulting in a higher percentage of element lanthanum in the surface region of the positive electrode active material as compared to the inner region. In some embodiments, based on weight of the mixture, the first mixture, or the second mixture, a percentage of element lanthanum is 0.01% to 5%. In some embodiments, the percentage of element lanthanum is 0.05% to 3%. In some embodiments, the percentage of element lanthanum is 0.1% to 2%. In some embodiments, the percentage of element lanthanum is 0.5% to 1%.

In some embodiments, at least one of the mixture, the first mixture, or the second mixture further includes a compound containing element M, the element M including at least one of the following elements: lithium, cobalt, nickel, manganese, magnesium, titanium, zirconium, fluorine, yttrium, niobium, boron, molybdenum, vanadium, or cerium.

In some embodiments, at least one of the mixture, the first mixture, or the second mixture further includes a compound containing element M, the element M including lithium, cobalt, and at least one of the following elements: nickel, manganese, magnesium, titanium, zirconium, fluorine, yttrium, niobium, boron, molybdenum, vanadium, or cerium.

In some embodiments, at least one of the mixture, the first mixture, or the second mixture further includes a compound containing element M, the element M including at least one of the following elements: magnesium, titanium, zirconium, fluorine, yttrium, niobium, boron, molybdenum, vanadium, or cerium.

In some embodiments, at least one of the raw material, the first raw material, or the second raw material further includes a compound containing element M, the element M including at least one of the following elements: lithium, cobalt, nickel, manganese, magnesium, titanium, zirconium, fluorine, yttrium, niobium, boron, molybdenum, vanadium, or cerium.

In some embodiments, at least one of the raw material, the first raw material, or the second raw material further includes a compound containing element M, the element M including lithium, cobalt, and at least one of the following elements: nickel, manganese, magnesium, titanium, zirconium, fluorine, yttrium, niobium, boron, molybdenum, vanadium, or cerium.

In some embodiments, the compound containing element M is at least one of an oxide of element M, a hydroxide of element M, a carbonate of element M, a phosphate of element M, or a fluoride of element M.

In some embodiments, at least one of the precursor materials of the positive electrode active material, the precursor materials of the first positive electrode active material, or the precursor materials of the second positive electrode active material includes a compound containing element cobalt and a lithium salt.

In some embodiments, the compound containing element cobalt includes at least one of cobalt oxide or cobalt hydroxide.

In some embodiments, the lithium salt includes at least one of lithium carbonate, lithium oxide, or lithium hydroxide.

In some embodiments, a molar ratio of the compound containing element cobalt to the lithium salt is 0.90:1 to 1.1:1. In some embodiments, a molar ratio of the compound containing element cobalt to the lithium salt is 0.90:1 to 1.08:1.

In some embodiments, in the step S3, the first particles and the second particles are mixed at a mass ratio of 1:9-9:1 to obtain the positive electrode active material. In some embodiments, in the step S3, the first particles and the second particles are mixed at a mass ratio of 2:8-8:2. In some embodiments, in the step S3, the first particles and the second particles are mixed at a mass ratio of 3:7-7:3. In some embodiments, in the step S3, the first particles and the second particles are mixed at a mass ratio of 4:6-6:4. In some embodiments, in the step S3, the first particles and the second particles are mixed at a mass ratio of 5:5.

Negative Electrode

A negative electrode includes a current collector and a negative electrode active material layer provided on the current collector. The specific types of the negative electrode active material are not subject to specific restrictions, and can be selected according to requirements.

In some embodiments, the negative electrode active material is one or more selected from natural graphite, artificial graphite, mesocarbon microbeads (MCMB for short), hard carbon, soft carbon, silicon, a silicon-carbon composite, a Li—Sn alloy, a Li—Sn—O alloy, Sn, SnO, $SnO_2$, spinel-structure lithiated $TiO_2$—$Li_4Ti_5O_{12}$, and a Li—Al alloy.

Non-limiting examples of the carbon material include crystalline carbon, amorphous carbon, and a mixture thereof. The crystalline carbon may be amorphous, plate-shaped, flake-shaped, spherical or fiber-shaped natural graphite or artificial graphite. The amorphous carbon may be soft carbon, hard carbon, a mesophase pitch carbonization product, burnt coke, or the like.

In some embodiments, the negative electrode active material layer may include a binder and optionally further include a conductive material.

The binder enhances bonding between particles of the negative active material, and bonding between the negative active material and the current collector. Non-limiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-difluoroethylene), polyethylene, polypropylene, styrene-butadiene rubber, acrylic styrene-butadiene rubber, epoxy resin, nylon, and the like.

The negative electrode active material layer includes a negative electrode conductive material, thereby imparting conductivity to the electrode. The conductive material may include any conductive material, provided that such conductive material causes no chemical change. Non-limiting examples of the conductive material include a carbon-based material (for example, natural graphite, artificial graphite, carbon black, acetylene black, Ketjen black, and carbon fiber), a metal-based material (for example, metal powder, and metal fiber, including copper, nickel, aluminum, and silver), a conductive polymer (for example, a polyphenylene derivative), and a mixture thereof.

The current collector used for the negative electrode in this application may be selected from copper foil, nickel foil, stainless steel foil, titanium foil, nickel foam, copper foam, a polymer base coated with conductive metal, and a combination thereof Electrolyte A lithium salt applicable to the electrolyte in some embodiments of this application includes but is not limited to: inorganic lithium salts, such as $LiClO_4$, $LiAsF_6$, $LiPF_6$, $LiBF_4$, $LiSbF_6$, $LiSO_3F$, and $LiN(FSO_2)_2$; fluorine-containing organic lithium salts, such as $LiCF_3SO_3$, $LiN(FSO_2)$$(CF_3SO_2)$, $LiN(CF_3SO_2)_2$, $LiN(C_2F_5SO_2)_2$, cyclic 1,3-hexafluoropropane disulfonimide lithium, cyclic 1,2-tetrafluoroethane disulfonimide lithium, $LiN(CF_3SO_2)$$(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2$$(C_2F_5)_2$, $LiBF_2(CF_3SO_2)_2$, and $LiBF_2(C_2F_5SO_2)_2$; and lithium salts including dicarboxylic acid complex, such as bis(oxalato) lithium borate, difluorooxalato lithium borate, tris(oxalato) lithium phosphate, difluorobis(oxalato) lithium phosphate, and tetrafluoro(oxalato) lithium phosphate. In addition, one of the foregoing lithium salts may be used alone, or two or more thereof may be used. In some embodiments, the lithium salt includes a combination of $LiPF_6$ and $LiBF_4$. In some embodiments, the lithium salt includes a combination of inorganic lithium salt such as $LiPF_6$ or $LiBF_4$ and fluorine-containing organic lithium salt such as $LiCF_3SO_3$, $LiN(CF_3SO_2)_2$, or $LiN(C_2F_5SO_2)_2$. In some embodiments, a concentration of the lithium salt falls within the range of 0.8 mol/L to 3 mol/L, 0.8 mol/L to 2.5 mol/L, 0.8 mol/L to 2 mol/L, or 1 mol/L to 2 mol/L. In some embodiments, the concentration of the lithium salt is about 1 mol/L, about 1.15 mol/L, about 1.2 mol/L, about 1.5 mol/L, about 2 mol/L, or about 2.5 mol/L.

A solvent applicable to the electrolyte in some embodiments of this application includes but is not limited to one or more of the following: cyclic carbonate, linear carbonate, cyclic carboxylate, linear carboxylate, cyclic ether, linear ether, a phosphorus-containing organic solvent, a sulfur-containing organic solvent, and an aromatic fluorine-containing solvent.

In some embodiments, the cyclic carbonate includes but is not limited to ethylene carbonate (EC), propylene carbonate (PC), and butylene carbonate. In some embodiments, the cyclic carbonate has 3-6 carbon atoms.

In some embodiments, the linear carbonate includes but is not limited to dimethyl carbonate, ethyl methyl carbonate, diethyl carbonate (DEC), methyl n-propyl carbonate, ethyl n-propyl carbonate, and dipropyl carbonate, as a linear carbonate substituted with fluorine, such as bis(fluoromethyl) carbonate, bis(difluoromethyl) carbonate, bis (trifluoromethyl) carbonate, bis(2-fluoroethyl) carbonate, bis (2,2-difluoroethyl) carbonate, bis(2,2,2-trifluoroethyl) carbonate, 2-fluoroethyl methyl carbonate, 2,2-difluoroethyl methyl carbonate, and 2,2,2-trifluoroethyl methyl carbonate.

In some embodiments, the cyclic carboxylate includes but is not limited to γ-butyrolactone and γ-valerolactone. In some embodiments, some hydrogen atoms in the cyclic carboxylate may be substituted with fluorine.

In some embodiments, the linear carboxylate includes but is not limited to methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, some hydrogen atoms in the linear carboxylate may be substituted with fluorine. In some embodiments, the fluorine-substituted linear carboxylate includes but is not limited to methyl trifluoroacetate, ethyl trifluoroacetate, propyl trifluoroacetate, butyl trifluoroacetate, and 2,2,2-trifluoroethyl trifluoroacetate.

In some embodiments, the cyclic ether includes but is not limited to tetrahydrofuran, 2-methyltetrahydrofuran, 1,3-dioxolane, 2-methyl 1,3-dioxolane, 4-methyl 1,3-dioxolane, 1,3-dioxane, 1,4-dioxane, and dimethoxypropane.

In some embodiments, the chain ether includes but is not limited to dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, the phosphorus-containing organic solvent includes but is not limited to trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, and tris(2,2,3,3,3-pentafluoropropyl) phosphate.

In some embodiments, the sulfur-containing organic solvent includes but is not limited to sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, some hydrogen atoms in the sulfur-containing organic solvent may be substituted with fluorine.

In some embodiments, the aromatic fluorine-containing solvent includes but is not limited to fluorobenzene, difluorobenzene, trifluorobenzene, tetrafluorobenzene, pentafluorobenzene, hexafluorobenzene, and trifluoromethylbenzene.

In some embodiments, the solvent used in the electrolyte in this application includes one or more of the foregoing solvents. In some embodiments, the solvent used in the electrolyte solution in this application includes cyclic carbonate, linear carbonate, cyclic carboxylate, linear carboxylate, and a combination thereof. In some embodiments, the solvent used in the electrolyte in this application includes an organic solvent selected from a group consisting of the following substances: ethylene carbonate, propylene carbonate, diethyl carbonate, ethyl propionate, propyl propionate, propyl acetate, ethyl acetate, and a combination thereof. In some embodiments, the solvent used in the electrolyte solution in this application includes ethylene carbonate, propylene carbonate, diethyl carbonate, ethyl propionate, propyl propionate, γ-butyrolactone, or a combination thereof.

An additive used in the electrolyte in some embodiments of this application includes but is not limited to a compound having 2-3 cyano groups, a carbon-carbon double bond-containing cyclic carbonate, a sulfur-oxygen double bond-containing compound, and lithium difluorophosphate.

In some embodiments, the compound having 2-3 cyano groups may include at least one selected from succinonitrile (SN), adiponitrile (ADN), ethylene glycol bis(propionitrile) ether (EDN), 1,3,5-pentanetricarbonitrile, 1,2,3-propanetricarbonitrile, 1,3,6-hexanetricarbonitrile (HTCN), 1,2,6-hexanetricarbonitrile, 1,2,3-tris(2-cyanoethoxy)propane (TCEP), or 1,2,4-tris(2-cyanoethoxy)butane; and based on total weight of the electrolyte, a percentage of the compound having 2-3 cyano groups is 0.1% to 10%.

In some embodiments, the carbon-carbon double bond-containing cyclic carbonate specifically includes but is not limited to at least one of vinylene carbonate, methyl vinylene carbonate, ethyl vinylene carbonate, vinylethylene ethylene carbonate, or 1,2-dimethylvinylene carbonate.

In some embodiments, the sulfur-oxygen double bond-containing compound includes but is not limited to at least one of vinyl sulfate, 1,2-propanediol sulfate, 1,3-propane sultone, 1-fluoro-1,3-propane sultone, 2-fluoro-1,3-propane sultone, or 3-fluoro-1,3-propane sultone.

Separator

A separator is provided between the positive electrode and the negative electrode to prevent short circuit. A material and shape of the separator used in some embodiments of this application are not specifically limited, and any technology disclosed in the prior art may be used for the separator. In some embodiments, the separator includes a polymer or an inorganic substance formed by a material stable to the electrolyte in this application.

For example, the separator may include a substrate layer and a surface treatment layer. The substrate layer is a non-woven fabric, a membrane, or a composite membrane having a porous structure, and a material of the substrate layer is at least one selected from polyethylene, polypropylene, polyethylene terephthalate, or polyimide. Specifically, a polypropylene porous membrane, a polyethylene porous membrane, a polypropylene non-woven fabric, a polyethylene non-woven fabric, or a polypropylene-polyethylene-polypropylene porous composite membrane may be selected.

The surface treatment layer is provided on at least one surface of the substrate layer, and the surface treatment layer may be a polymer layer or an inorganic layer, or may be a layer formed by a mixed polymer and an inorganic substance.

The inorganic layer includes inorganic particles and a binder. The inorganic particles are one or a combination selected from aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is one or a combination selected from polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene.

The polymer layer includes a polymer, and a material of the polymer is at least one selected from polyamide, polyacrylonitrile, an acrylate polymer, polyacrylic acid, polyacrylate, polyvinylpyrrolidone, polyvinyl ether, polyvinylidene fluoride, and poly(vinylidene fluoride-hexafluoropropylene).

Electrochemical Apparatus

The electrochemical apparatus according to this application includes any apparatus in which electrochemical reactions take place. Specific examples of the apparatus include all kinds of primary batteries and secondary batteries. The lithium secondary battery may include a lithium metal secondary battery, a lithium-ion secondary battery, a lithium polymer secondary battery, or a lithium-ion polymer secondary battery.

Electronic Apparatus

This application also provides an electronic apparatus, including the electrochemical apparatus according to this application. The electrochemical apparatus of this application is not particularly limited to any purpose and may be used for any known electronic apparatus in the prior art. In some embodiments, the electrochemical apparatus of this application may be used for, without limitation, a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, and a lithium-ion capacitor.

The following uses a lithium-ion battery as an example and describes preparation of a lithium-ion battery with reference to specific examples. A person skilled in the art understands that the preparation method described in this application is only an example, and that all other suitable preparation methods fall within the scope of this application.

Example

The following describes performance evaluation performed based on examples and comparative examples of the lithium-ion battery in this application.

I. Preparation of Lithium-Ion Battery
1. Preparation of Positive Electrode
Preparation of Positive Electrode Active Material of Comparative Example 1

1000 g of tricobalt tetroxide and 461 g of lithium carbonate were weighed separately, with the Dv50 of tricobalt tetroxide being 12 μm and without adding lanthanum oxide and alumina additives, mixed, and then sintered at 1050° C. for 16 hours in an air atmosphere to obtain a primary positive electrode active material. The obtained primary positive electrode active material was further sintered at 800° C. for 12 hours to obtain a positive electrode active material.

Preparation of Positive Electrode Active Material of Comparative Example 2

1000 g of tricobalt tetroxide, 461 g of lithium carbonate, and 0.23 g of aluminum oxide were weighed separately, with the Dv50 of tricobalt tetroxide being 12 μm, mixed, and then sintered at 1000° C. for 15 hours in an air atmosphere to obtain a primary positive electrode active material. The obtained primary positive electrode active material and 0.12 g of aluminum oxide were mixed and further sintered at 850° C. for 10 hours to obtain a positive electrode active material.

Preparation of Positive Electrode Active Materials of Comparative Examples 3 and 4

The preparation method is basically the same as that in Comparative example 2, except that the percentages of element aluminum in the surface region and the inner region of the positive electrode active material were adjusted by varying the amount of element aluminum added, to obtain the positive electrode active material.

Preparation of Positive Electrode Active Material of Comparative Example 5

1000 g of tricobalt tetroxide and 461 g of lithium carbonate were weighed separately, with the Dv50' of tricobalt tetroxide being 4 μm and the median particle size of primary particles of tricobalt tetroxide being 0.3 μm, mixed, and then sintered at 800° C. for 12 hours in an air atmosphere to obtain a primary positive electrode active material. The obtained primary positive electrode active material was further sintered at 700° C. for 12 hours to obtain a positive electrode active material.

Preparation of Positive Electrode Active Material of Comparative Example 6

1000 g of tricobalt tetroxide and 461 g of lithium carbonate were weighed separately, with the Dv50 of tricobalt tetroxide being 12 μm, mixed, and then sintered at 1050° C. for 16 hours in an air atmosphere to obtain a first primary positive electrode active material; and the obtained first primary positive electrode active material was sintered at 800° C. for 12 hours to obtain first particles.

250 g of tricobalt tetroxide and 115 g of lithium carbonate were weighed separately, with the Dv50' of tricobalt tetroxide being 3 μm and the median particle size of primary particles of tricobalt tetroxide being 0.3 μm, mixed, and then sintered at 800° C. for 12 hours in an air atmosphere to obtain a second primary positive electrode active material; and the obtained second primary positive electrode active material was sintered at 700° C. for 12 hours to obtain second particles.

The prepared first particles and second particles were mixed at a mass ratio of 8:2 to obtain a positive electrode active material.

Preparation of Positive Electrode Active Material of Example 1

1000 g of tricobalt tetroxide and 461 g of lithium carbonate were weighed separately, with the Dv50 of tricobalt tetroxide being 12 μm, mixed, and then sintered at 1020° C. for 15 hours in an air atmosphere to obtain a primary positive electrode active material; and the obtained primary positive electrode active material and 0.23 g of aluminum oxide were mixed, and a resulting mixture was sintered at 800° C. for 12 hours to obtain a positive electrode active material.

Preparation of Positive Electrode Active Materials of Examples 2 and 3

The preparation method is basically the same as that in Example 1, except that the percentage of element aluminum in the surface region of the positive electrode active material was adjusted by varying the amount of element aluminum added.

Preparation of Positive Electrode Active Material of Example 4

1000 g of tricobalt tetroxide, 461 g of lithium carbonate, and 4.6 g of aluminum oxide were weighed separately, with the Dv50 of tricobalt tetroxide being 12 μm, mixed, and then sintered at 1050° C. for 16 hours in an air atmosphere to obtain a primary positive electrode active material. the obtained primary positive electrode active material and 0.23 g of aluminum oxide were mixed, and a resulting mixture was sintered at 800° C. for 12 hours to obtain a positive electrode active material.

Preparation of Positive Electrode Active Materials of Examples 5 to 21

The preparation method is basically the same as that in Example 4, except that the percentages of element aluminum in the surface region and inner region of the positive electrode active material were adjusted by varying the amount of element aluminum added.

Preparation of Positive Electrode Active Material of Example 22

1000 g of tricobalt tetroxide, 461 g of lithium carbonate, and 23 g of aluminum oxide were weighed separately, with the Dv50' of tricobalt tetroxide being 4.0 μm and the median particle size of primary particles of tricobalt tetroxide being 0.3 μm, mixed, and then sintered at 800° C. for 12 hours in an air atmosphere to obtain a primary positive electrode active material; and the obtained primary positive electrode active material and 3.5 g of aluminum oxide were mixed and sintered at 700° C. for 12 hours to obtain a positive electrode active material.

Preparation of Positive Electrode Active Material of Example 23

1000 g of tricobalt tetroxide, 461 g of lithium carbonate, and 17.3 g of aluminum oxide were weighed separately, with the Dv50 of tricobalt tetroxide being 12 μm, mixed, and then sintered at 1050° C. for 16 hours in an air atmosphere to obtain uncoated lithium cobaltate; and the obtained uncoated lithium cobaltate, 3.5 g of aluminum oxide, and 0.7 g of lanthanum oxide were mixed, with no other element added, and a resulting mixture was sintered at 800° C. for 12 hours to obtain a positive electrode active material.

Preparation of Positive Electrode Active Materials of Examples 24 to 33

The preparation method is basically the same as that in Example 23, except that the percentage of element lanthanum in the surface region of the positive electrode active material was adjusted by varying the amount of element lanthanum added.

Preparation of Positive Electrode Active Material of Example 34

1000 g of tricobalt tetroxide, 461 g of lithium carbonate, 17.3 g of aluminum oxide, and 0.7 g of lanthanum oxide were weighed separately, with the Dv50 of tricobalt tetroxide being 12 μm, mixed, and then sintered at 1050° C. for 16 hours in an air atmosphere to obtain a primary positive electrode active material; and the obtained primary positive electrode active material, 3.5 g of aluminum oxide, and 1.4 g of lanthanum oxide were mixed, and a resulting mixture was sintered at 800° C. for 12 hours to obtain a positive electrode active material.

Preparation of Positive Electrode Active Materials of Examples 35 to 44

The preparation method is basically the same as that in Example 34, except that the percentages of element lanthanum in the inner region, element aluminum in the surface region, and element lanthanum in the surface region of the positive electrode active material were adjusted by varying the amount of element aluminum or element lanthanum added.

Preparation of Positive Electrode Active Material of Example 45

1000 g of tricobalt tetroxide, 461 g of lithium carbonate, 1.0 g of lanthanum oxide, and 17.3 g of aluminum oxide were weighed separately, with the median particle size of 12 μm of tricobalt tetroxide, mixed, and then sintered at 1050° C. for 16 hours in an air atmosphere to obtain a primary positive electrode active material; and the obtained primary positive electrode active material, 1.4 g of lanthanum oxide, 3.5 g of aluminum oxide, and 2.0 g of titanium dioxide were mixed, and a resulting mixture was sintered at 800° C. for 12 hours to obtain a positive electrode active material.

Preparation of Positive Electrode Active Material of Example 46

1000 g of tricobalt tetroxide, 461 g of lithium carbonate, 1.0 g of lanthanum oxide, and 17.3 g of aluminum oxide were weighed separately, with the Dv50 of tricobalt tetroxide being 12 μm, mixed, and then sintered at 1050° C. for 16 hours in an air atmosphere to obtain a primary positive electrode active material; and the obtained primary positive electrode active material, 1.4 g of lanthanum oxide, 3.5 g of aluminum oxide, and 1.8 g of zirconium oxide were mixed, and a resulting mixture was sintered at 800° C. for 12 hours to obtain a positive electrode active material.

Preparation of Positive Electrode Active Material of Example 47

1000 g of tricobalt tetroxide, 461 g of lithium carbonate, 1.0 g of lanthanum oxide, and 17.3 g of aluminum oxide were weighed separately, with the Dv50 of tricobalt tetroxide being 12 μm, mixed, and then sintered at 1050° C. for 16 hours in an air atmosphere to obtain a primary positive electrode active material; and the obtained primary positive electrode active material, 1.4 g of lanthanum oxide, 3.5 g of aluminum oxide, 1.5 g of yttrium oxide and 2.0 g of titanium dioxide were mixed, and a resulting mixture was sintered at 800° C. for 12 hours to obtain a positive electrode active material.

Preparation of Positive Electrode Active Material of Example 48

1000 g of tricobalt tetroxide, 461 g of lithium carbonate, 1.0 g of lanthanum oxide, and 17.3 g of zirconium oxide were weighed separately, with the Dv50 of tricobalt tetroxide being 12 μm X1, mixed, and then sintered at 1050° C. for 16 hours in an air atmosphere to obtain a first primary positive electrode active material; and the obtained first primary positive electrode active material, 1.4 g of lanthanum oxide, 3.5 g of aluminum oxide, and 2.0 g of titanium dioxide were mixed, and a resulting mixture was sintered at 800° C. for 12 hours to obtain first particles.

250 g of tricobalt tetroxide, 115 g of lithium carbonate, 0.3 g of lanthanum oxide, and 4.3 g of aluminum oxide were weighed separately, with the Dv50' of tricobalt tetroxide being 3 μm and the median particle size of primary particles of tricobalt tetroxide being 0.3 μm, mixed, and then sintered at 800° C. for 12 hours in an air atmosphere to obtain a second positive electrode active material; and the obtained second primary positive electrode active material, 0.4 g of lanthanum oxide, 0.9 g of aluminum oxide, and 0.5 g of titanium dioxide were mixed, and a resulting mixture was sintered at 700° C. for 12 hours to obtain second particles.

The prepared first particles and second particles were mixed at a mass ratio of 8:2 to obtain a positive electrode active material.

Preparation of Positive Electrode Active Materials of Examples 49 to 68

The preparation method is basically the same as that in Example 48, except for the Dv50 of the first particles, the Dv99 of the first particles, the Dv50' of the second particles, and/or the particle size of the primary particles in the second particles of the positive electrode active material.

Preparation of Positive Electrode Active Material of Examples 69 to 86

The preparation method is basically the same as that in Example 48, except that the percentage of element lanthanum in the first particles of the positive electrode active material and/or the percentage of element lanthanum in the first particles was adjusted by varying the amount of element lanthanum added.

A positive electrode active material, acetylene black, and polyvinylidene fluoride (PVDF) at a weight ratio of 94:3:3 were dissolved in N-methylpyrrolidone (NMP), fully stirred and mixed well to obtain a positive electrode slurry. The positive electrode slurry was applied onto a positive electrode current collector aluminum foil, followed by drying and cold pressing, to obtain a positive electrode active material layer. Then after cutting and tab welding, a positive electrode was obtained.

2. Preparation of Negative Electrode

Artificial graphite, sodium carboxymethyl cellulose (CMC), and styrene-butadiene rubber (SBR) at a weight ratio of 96:2:2 were dissolved in the solvent deionized water, fully stirred, and mixed to form a uniform negative electrode slurry. The negative electrode slurry was applied on a negative electrode current collector copper foil, and the resulting current collector was dried at 85° C., followed by trimming, cutting, slitting, and drying, to obtain a negative electrode active material layer. Then after cutting and tab welding, a negative electrode was obtained.

3. Preparation of Electrolyte

In a dry argon atmosphere, $LiPF_6$ was added into a solvent obtained by mixing propylene carbonate (PC), ethylene carbonate (EC), and diethyl carbonate (DEC) (at a weight ratio of 1:1:1) and mixed to uniformity, and then based on total weight of the electrolyte, 4% fluoroethylene carbonate, 2% 1,3-propane sultone, 3% adiponitrile, and 1% 1,3,6-hexanetricarbonitrile were added to obtain the electrolyte, where a concentration of the $LiPF_6$ is 1.15 mol/L.

4. Preparation of Separator

APE porous polymer film with a thickness of 10 μm was used as a separator.

5. Preparation of Lithium-Ion Battery

A positive electrode, a separator, and a negative electrode were stacked in order, wound, and placed in an outer package. An electrolyte was injected, and then sealing was performed, followed by processes such as formation, degassing, and trimming, to obtain a lithium-ion battery.

II. Test Method

1. Method for Testing Content of Element

At 25° C., 1 g of sample powder under test was added into 100 mL of 3% hydrochloric acid solution and digested at a constant temperature of 25° C. for 4 hours, then the solution was filtered, and the filtrate and filter residue were taken respectively.

The content of an element in the surface region of the sample was measured by the following method: diluting the volume of the filtrate to 200 mL, and using an inductively coupled plasma optical emission spectrometer (ICP-OES) to measure the contents of element aluminum and element lanthanum in the filtrate.

The content of an element in the inner region of the sample was measured by the following method: adding the filter residue to 10 mL of aqua regia for complete digestion, diluting the volume of the digested solution to 50 mL, and using the ICP-OES to measure the content of element lanthanum in the digestion solution.

2. Method for Testing Particle Sizes of First Particles and Second Particles

A lithium-ion battery was discharged to a voltage of 3.0 V. The positive electrode active material layer was removed from the positive electrode, placed in a muffle furnace, and burned at 350° C. for 4 hours in an air atmosphere, then cooled and taken out the sample. The sample was sifted with an 800-mesh sieve to obtain first particles and second particles.

0.5 g of the sample powder under test was taken and added to a 100 mL beaker, with a certain amount of pure water added, and stirred using a glass rod to make the sample evenly dispersed. The sample was placed into the circulating bath of the laser particle size (LPS) tester for testing, and the test results of the particle size (Dv50, Dv50', or Dv99) were recorded.

3. Method for Testing Median Particle Size of Primary Particles in Secondary Particles 0.5 g of the sample powder under test was taken and placed in a scanning electron microscope (SEM) for observing cross-sectional images. The magnification was enlarged to 10,000 times and the particle sizes of all primary particles within the cross-section of the secondary particles in the displayed range were measured, and then the median particle size was calculated.

4. Method for Testing XRD

The sample powder under test was tested using an X-ray powder diffractometer with reference to the determination method according to JB/T 4220-2011, and the XRD spectra pattern of the sample was obtained after the test.

5. Method for Testing EIS Impedance

At 25° C., a lithium-ion battery was charged to 3.85 V at a constant current of 0.5 C rate. After reaching 3.85 V, the lithium-ion battery was charged to 0.025 C at a constant voltage of 3.85 V, and left standing for 5 minutes. Subsequently, an alternating current impedance (EIS) test was carried out using an EIS impedance tester. The frequency range for the EIS test was set at 0.1-10 kHz, and the amplitude was set at 5 mV. The Rct impedance value of the lithium-ion battery was obtained through the EIS test.

6. Method for Testing High-Temperature Storage Swelling Rate

At 25° C., a lithium-ion battery was charged to 4.50 V at a constant current of 0.5 C rate, and then charged to a current less than 0.05 C at a constant voltage of 4.50 V. The lithium-ion battery was kept in a fully charged state of 4.50 V. The thickness of the lithium-ion battery in the fully charge state before storage was measured and denoted as D0. Then, the lithium-ion battery in the fully charged state was placed in an oven at 85° C. and stored for 24 hours. After that, the lithium-ion battery was taken out and tested for thickness after storage, and the thickness was denoted as D1.

High-temperature storage swelling rate of the lithium-ion battery was calculated according to the following equation:

High-temperature storage swelling rate=$(D1-D0)/D0 \times 100\%$.

7. Method for Testing Cycling Capacity Retention Rate

At 25° C., the initial charge-discharge cycle was performed as follows: A lithium-ion battery was charged at a constant current of 0.5 C charging rate to 4.50 V, then charged to 0.025 C at a constant voltage and left standing for 5 minutes. Then, the battery was discharged at a constant current of 0.5 C rate to 3.0V. The initial cycle discharge capacity value was recorded. The same steps were performed to charge and discharge the lithium-ion battery for 800 cycles, and the discharge capacity value of the 800-th cycle was recorded. The cycling capacity retention rate of the lithium-ion battery was calculated according to the following equation:

Cycling capacity retention rate=(discharge capacity at the 800-th cycle/discharge capacity at the first cycle)$\times 100\%$.

3. Test Results

Table 1 shows the influence of the element aluminum and its percentages in the surface region and inner region of the positive electrode active material on the impedance, cycling capacity retention rate, and high-temperature storage swelling rate of lithium-ion batteries. The positive electrode active material precursor used in examples and comparative examples in Table 1 is lithium cobaltate ($LiCoO_2$). The positive electrode active materials used in the examples and comparative examples in Table 1 contain only one type of particles, where the positive electrode active materials of Comparative examples 1-4 and Examples 1-21 contain only the first particles (Dv50 of 12 μm), and the positive electrode active materials of Comparative example 5 and Example 22 contain only the second particles (Dv50' of 4 μm).

TABLE 1

|  | Percentage of element aluminum in surface region, represented as A (wt %) | Percentage of element aluminum in inner region, represented as $A_1$ (wt %) | $A_1/A$ | Rct (Ω) | High-temperature storage swelling rate | Cycling capacity retention rate |
|---|---|---|---|---|---|---|
| Comparative example 1 | — | — | — | 0.914 | 57.2% | 33% |
| Comparative example 2 | 0.005 | 0.01 | 2.0 | 0.801 | 59.1% | 34% |

TABLE 1-continued

|  | Percentage of element aluminum in surface region, represented as A (wt %) | Percentage of element aluminum in inner region, represented as $A_1$ (wt %) | $A_1/A$ | Rct (Ω) | High-temperature storage swelling rate | Cycling capacity retention rate |
| --- | --- | --- | --- | --- | --- | --- |
| Comparative example 3 | 1.10 | 2.50 | 2.3 | 0.715 | 69.7% | 30% |
| Comparative example 4 | 1.10 | 0.50 | 0.5 | 0.815 | 61.3% | 32% |
| Example 1 | 0.01 | — | — | 0.665 | 41.1% | 51% |
| Example 2 | 0.05 | — | — | 0.652 | 40.9% | 52% |
| Example 3 | 0.08 | — | — | 0.637 | 40.6% | 54% |
| Example 4 | 0.01 | 0.20 | 20.0 | 0.603 | 41.0% | 55% |
| Example 5 | 0.10 | 0.60 | 6.0 | 0.591 | 38.1% | 59% |
| Example 6 | 0.15 | 0.75 | 5.0 | 0.468 | 33.7% | 64% |
| Example 7 | 0.20 | 0.80 | 4.0 | 0.487 | 34.1% | 63% |
| Example 8 | 0.25 | 0.65 | 2.6 | 0.451 | 34.9% | 63% |
| Example 9 | 0.01 | 0.05 | 5.0 | 0.600 | 40.1% | 56% |
| Example 10 | 0.12 | 1.20 | 10.0 | 0.553 | 39.6% | 62% |
| Example 11 | 0.40 | 1.20 | 3.0 | 0.555 | 38.4% | 61% |
| Example 12 | 0.60 | 1.20 | 2.0 | 0.575 | 39.5% | 61% |
| Example 13 | 1.00 | 1.20 | 1.2 | 0.593 | 42.2% | 60% |
| Example 14 | 0.45 | 0.80 | 1.8 | 0.583 | 46.3% | 59% |
| Example 15 | 0.45 | 0.40 | 0.9 | 0.651 | 50.5% | 50% |
| Example 16 | 0.45 | 0.90 | 2.0 | 0.541 | 41.9% | 63% |
| Example 17 | 0.45 | 1.20 | 2.7 | 0.536 | 40.7% | 62% |
| Example 18 | 0.15 | 0.45 | 3.0 | 0.531 | 36.4% | 60% |
| Example 19 | 0.15 | 2.10 | 14.0 | 0.673 | 52.3% | 47% |
| Example 20 | 0.15 | 1.20 | 8.0 | 0.522 | 39.9% | 61% |
| Example 21 | 0.15 | 2.0 | 13.3 | 0.692 | 48.1% | 51% |
| Comparative example 5 | — | — | — | 0.795 | 65.2% | 28% |
| Example 22 | 0.15 | 1.00 | 6.7 | 0.636 | 39.3% | 60% |

The results show that the percentage of element aluminum in the surface region of the positive electrode active material plays a crucial role in improving the impedance, high-temperature storage swelling rate, and cycling capacity retention rate of lithium-ion batteries under high-voltage operating conditions. Specifically, as shown in Table 1, with the positive electrode active material including only the first particles (Examples 1-21) or the second particles (Example 22) and the surface region of the positive electrode active material including 0.01 wt %-1 wt % of element aluminum, the stability of the bulk phase structure and the surface diffusion kinetics of the material can be effectively guaranteed, comprehensively improving the high-temperature cycling performance and impedance performance of the material, significantly reducing the impedance and high-temperature storage swelling rate of lithium-ion batteries under high-voltage operating conditions, and significantly improving its cycling capacity retention rate. With the percentage A of element aluminum in the surface region of the positive electrode active material being 0.01 wt %-0.4 wt %, the lithium-ion battery has exceptionally excellent cycling and storage performance.

The inner region of the positive electrode active material may further include element aluminum, and this helps to further improve the impedance, high-temperature storage swelling rate, and cycling capacity retention rate of lithium-ion batteries under high-voltage operating conditions. On the basis that the surface region of the positive electrode active material includes 0.01 wt %-1 wt % of element aluminum, with element aluminum of $A_1$ wt % in the inner region of the positive electrode active material satisfying that $A_1$ is 0.05 to 2; $A_1>A$; and/or $1<A_1/A<10$, the impedance and high-temperature storage swelling rate of lithium-ion batteries under high-voltage operating conditions can be further reduced, and the cycling capacity retention rate of lithium-ion batteries can be further improved.

Figure 1:
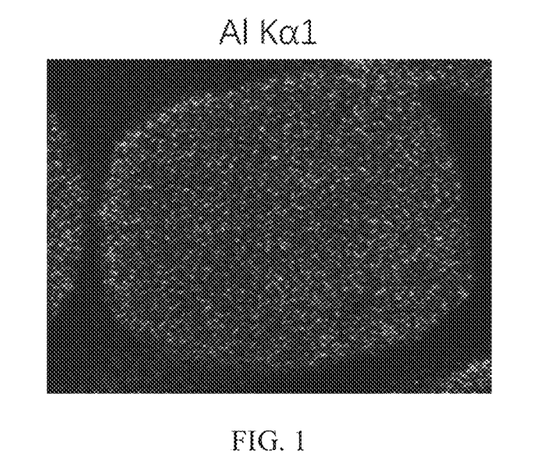
FIG. 1 shows a scanning electron microscope (SEM) image of the positive electrode active material used in Comparative example 1.
Figure 2:
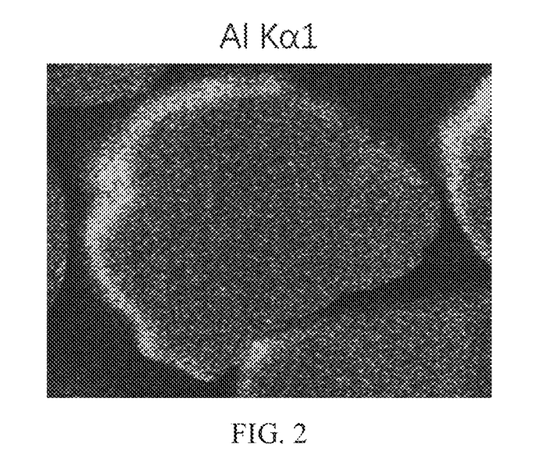
FIG. 2 shows a scanning electron microscope (SEM) image of the positive electrode active material used in Example 7.

FIG. 1 shows a scanning electron microscope (SEM) image of the positive electrode active material used in Comparative example 1, where the surface of the positive electrode active material includes no element aluminum. FIG. 2 shows a scanning electron microscope (SEM) image of the positive electrode active material used in Example 7, where the surface of the positive electrode active material includes element aluminum.

Table 2 shows the influence of the content of element aluminum in the surface region, the contents of element lanthanum in the surface region and inner region, and other elements in the surface region of the positive electrode active material on the impedance, cycling capacity retention rate, and high-temperature storage swelling rate of lithium-ion batteries. In Examples 23-47, only one type of particle (first particles) was included, with the only difference from Example 6 being the parameters listed in Table 2.

TABLE 2

|  | Percentage of element aluminum in surface region, represented as A (wt %) | Percentage of element lanthanum in surface region, represented as B (wt %) | Percentage of element lanthanum in inner region, represented as D (wt %) | B/A | B/D | Other elements in surface region | Rct (Ω) | High-temperature storage swelling rate | Cycling capacity retention rate |
|---|---|---|---|---|---|---|---|---|---|
| Example 6 | 0.15 | — | — | — | — | — | 0.468 | 33.7% | 64% |
| Example 23 | 0.15 | 0.05 | — | 0.3 | — | — | 0.342 | 24.8% | 69% |
| Example 24 | 0.15 | 0.01 | — | 0.07 | — | — | 0.402 | 27.8% | 67% |
| Example 25 | 0.15 | 0.09 | — | 0.6 | — | — | 0.312 | 22.2% | 71% |
| Example 26 | 0.15 | 0.12 | — | 0.8 | — | — | 0.316 | 22.9% | 70% |
| Example 27 | 0.15 | 0.20 | — | 1.3 | — | — | 0.412 | 28.7% | 65% |
| Example 28 | 0.15 | 0.30 | — | 2.0 | — | — | 0.436 | 29.1% | 64% |
| Example 29 | 0.15 | 0.70 | — | 4.7 | — | — | 0.437 | 29.5% | 65% |
| Example 30 | 0.15 | 0.007 | — | 0.05 | — | — | 0.432 | 33.2% | 65% |
| Example 31 | 0.50 | 0.005 | — | 0.01 | — | — | 0.431 | 33.4% | 65% |
| Example 32 | 0.50 | 0.004 | — | 0.008 | — | — | 0.459 | 33.7% | 64% |
| Example 33 | 0.15 | 0.90 | — | 4.7 | — | — | 0.452 | 33.1% | 64% |
| Example 34 | 0.15 | 0.10 | 0.05 | 0.7 | 2.0 | — | 0.305 | 21.3% | 81% |
| Example 35 | 0.15 | 0.10 | 0.007 | 0.7 | 14.3 | — | 0.431 | 33.0% | 65% |
| Example 36 | 0.15 | 0.10 | 0.02 | 0.7 | 5.0 | — | 0.313 | 22.2% | 80% |
| Example 37 | 0.15 | 0.10 | 0.01 | 0.7 | 10.0 | — | 0.421 | 27.9% | 73% |
| Example 38 | 0.15 | 0.10 | 0.15 | 0.7 | 0.7 | — | 0.444 | 32.3% | 69% |
| Example 39 | 0.15 | 0.10 | 0.60 | 0.7 | 0.17 | — | 0.445 | 33.5% | 67% |
| Example 40 | 0.15 | 0.10 | 0.40 | 0.7 | 0.3 | — | 0.429 | 29.8% | 70% |
| Example 41 | 0.20 | 0.15 | 0.15 | 0.8 | 1.0 | — | 0.274 | 22.9% | 74% |
| Example 42 | 0.20 | 0.15 | 0.13 | 0.8 | 1.2 | — | 0.264 | 21.1% | 75% |
| Example 43 | 0.45 | 0.05 | 0.35 | 0.1 | 0.1 | — | 0.455 | 32.2% | 66% |
| Example 44 | 0.10 | 0.15 | 0.15 | 1.5 | 1.0 | — | 0.439 | 31.2% | 66% |
| Example 45 | 0.15 | 0.10 | 0.07 | 0.7 | 1.4 | Ti | 0.201 | 18.4% | 82% |
| Example 46 | 0.15 | 0.10 | 0.07 | 0.7 | 1.4 | Zr | 0.213 | 19.1% | 81% |
| Example 47 | 0.15 | 0.10 | 0.07 | 0.7 | 1.4 | Ti + Y | 0.207 | 20.1% | 82% |

The results in Table 2 show that the surface region and/or inner region of the positive electrode active material may further include element lanthanum, and that element lanthanum can synergistically enhance the structural stability of the positive electrode active material with element aluminum in the surface region while improving the diffusion of lithium ions and reducing the surface impedance. On the basis that the surface region of the positive electrode active material includes 0.01 wt %-1 wt % of element aluminum, the percentage B wt % of element lanthanum in the surface region of the positive electrode active material satisfying that B is 0.01-0.8 and/or 0.01≤B/A≤0.8 helps to further reduce the impedance and high-temperature storage swelling rate of lithium-ion batteries under high-voltage operating conditions and further improve the cycling capacity retention rate of lithium-ion batteries. With the content of element lanthanum in the surface region of the positive electrode active material being in the range of 0.01 wt %-0.7 wt %, the lithium-ion battery has exceptionally excellent cycling and storage performance. On the basis that the surface region of the positive electrode active material includes 0.01 wt %-1 wt % of element aluminum, the content D wt % of element lanthanum in the inner region of the positive electrode active material satisfying that D is 0.01-0.4, B>D, and/or 1<B/D<10 helps to further reduce the impedance and high-temperature storage swelling rate of lithium-ion batteries under high-voltage operating conditions and further improve the cycling capacity retention rate of lithium-ion batteries.

The surface region of the positive electrode active material may further include other elements (for example, at least one of lithium, cobalt, nickel, manganese, magnesium, titanium, zirconium, fluorine, or yttrium), and this helps to further optimize the impedance, high-temperature storage swelling rate, and cycling capacity retention rate of lithium-ion batteries under high-voltage operating conditions.

Figure 3:
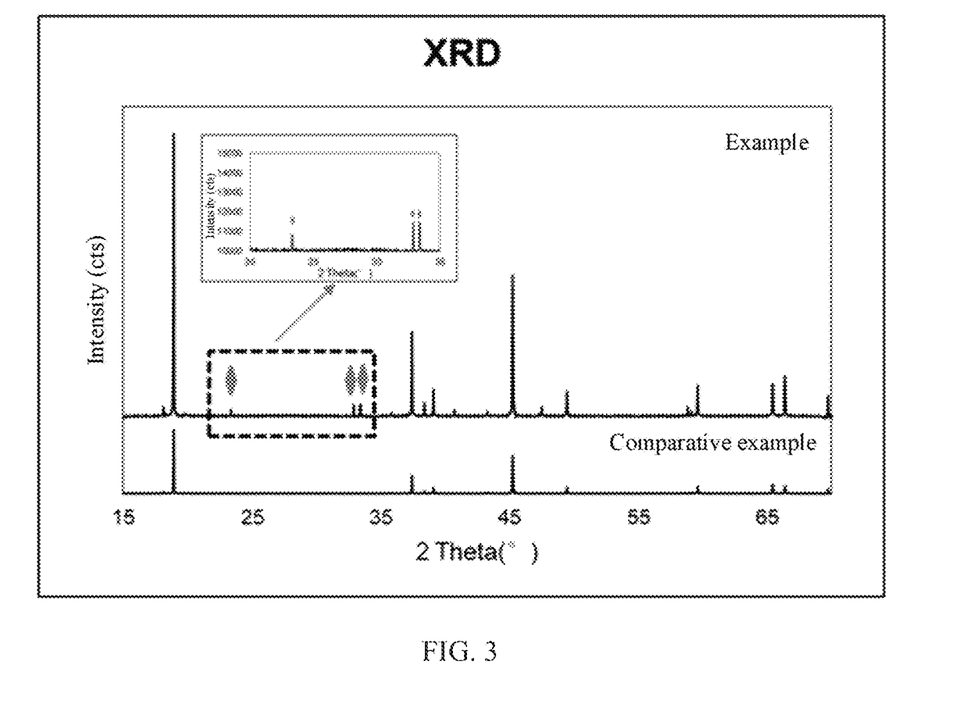
FIG. 3 shows X-ray diffraction (XRD) patterns of positive electrode active materials used in Comparative example 1 and Example 28.

FIG. 3 shows X-ray diffraction (XRD) patterns of positive electrode active materials used in Comparative example 1 and Example 28, where with the surface region of the positive electrode active material including element lanthanum, at least two new characteristic peaks of the positive electrode active material appear in the range of 23.0°-24.0° and 32.5°-33.5°, indicating the emergence of a new phase in the positive electrode active material.

Table 3 shows the influence of the particle size of the first particles, the particle size of the second particles, and the particle size of the primary particles in the second particles of the positive electrode active material on the impedance, cycling capacity retention rate, and high-temperature storage swelling rate of lithium-ion batteries. Two types of particles were included in Comparative example 6 and Examples 48-68, that is, the first particles and the second particles. Both the first particles and the second particles of the positive electrode active material in Comparative example 6 included no element aluminum. In Examples 48-68, in the first particles, the surface region included 0.15 wt % of element aluminum and 0.10 wt % of element lanthanum, and the inner region included 0.75 wt % of element aluminum and 0.07 wt % of element lanthanum; and in the second particles, the surface region included 0.15 wt % of element aluminum and 0.10 wt % of element lanthanum, and the inner region included 0.75 wt % of element aluminum and 0.15 wt % of element lanthanum.

TABLE 3

| | Dv50 particle size of first particles (μm) | Dv99 particle size of first particles (μm) | Dv50' particle size of second particles (μm) | Median particle size of primary particles in second particles (μm) | Dv99/Dv50 | Dv50/Dv50' | Rct (Ω) | High-temperature storage swelling rate | Cycling capacity retention rate |
|---|---|---|---|---|---|---|---|---|---|
| Comparative example 6 | 12 | 27 | 3 | 0.3 | 2.3 | 4.0 | 0.698 | 63.7% | 35% |
| Example 48 | 12 | 27 | 3 | 0.3 | 2.3 | 4.0 | 0.185 | 17.6% | 84% |
| Example 49 | 10 | 20 | 3 | 0.3 | 2.0 | 3.3 | 0.263 | 27.0% | 69% |
| Example 50 | 10 | 25 | 3 | 0.3 | 2.5 | 3.3 | 0.197 | 17.3% | 83% |
| Example 51 | 8 | 19 | 3 | 0.3 | 2.7 | 2.6 | 0.364 | 38.2% | 66% |
| Example 52 | 15 | 21 | 3 | 0.3 | 1.4 | 5.0 | 0.359 | 37.1% | 68% |
| Example 53 | 15 | 23 | 3 | 0.3 | 1.5 | 7.7 | 0.192 | 18.6% | 81% |
| Example 54 | 17 | 30 | 3 | 0.3 | 1.8 | 5.7 | 0.360 | 37.2% | 67% |
| Example 55 | 12 | 35 | 3 | 0.3 | 2.9 | 4.0 | 0.358 | 37.9% | 66% |
| Example 56 | 12 | 38 | 3 | 0.3 | 3.2 | 12.7 | 0.375 | 39.8% | 63% |
| Example 57 | 15 | 28 | 2.1 | 0.3 | 1.9 | 7.0 | 0.257 | 26.6% | 76% |
| Example 58 | 12 | 27 | 1.0 | 0.3 | 2.3 | 12.0 | 0.369 | 37.9% | 65% |
| Example 59 | 12 | 27 | 1.5 | 0.3 | 2.3 | 8.0 | 0.355 | 36.6% | 67% |
| Example 60 | 12 | 27 | 2 | 0.3 | 2.3 | 6.0 | 0.214 | 21.8% | 76% |
| Example 61 | 12 | 27 | 4 | 0.3 | 2.3 | 3.0 | 0.189 | 17.1% | 82% |
| Example 62 | 12 | 27 | 6 | 0.3 | 2.3 | 2.0 | 0.251 | 25.2% | 75% |
| Example 63 | 12 | 27 | 8 | 4 | 2.3 | 1.5 | 0.352 | 29.1% | 72% |
| Example 64 | 12 | 27 | 4 | 0.05 | 2.3 | 3.0 | 0.297 | 26.9% | 74% |
| Example 65 | 12 | 27 | 4 | 0.1 | 2.3 | 3.0 | 0.254 | 21.8% | 79% |
| Example 66 | 12 | 27 | 4 | 0.5 | 2.3 | 3.0 | 0.151 | 15.7% | 85% |
| Example 67 | 12 | 27 | 4 | 1.0 | 2.3 | 3.0 | 0.193 | 17.3% | 84% |
| Example 68 | 12 | 27 | 4 | 3.0 | 2.3 | 3.0 | 0.215 | 21.2% | 80% |

The results show that with the positive electrode active material satisfying that the Dv50 of the first particles is in the range of 10 μm to 15 μm, the Dv99 of the first particles is in the range of 20 μm to 30 μm, the Dv50' of the second particles is in the range of 2 μm to 6 μm, 1.5≤Dv99/Dv50<3, and/or 2≤Dv50/Dv50'<8, the impedance, high-temperature storage swelling rate, and cycling capacity retention rate of lithium-ion batteries under high-voltage operating conditions can be further improved.

When the second particles of the positive electrode active material include secondary particles and the primary particles forming the secondary particles have a median particle size of 0.1 μm to 3 μm, this helps to further improve the impedance, high-temperature storage swelling rate, and cycling capacity retention rate of lithium-ion batteries under high-voltage operating conditions.

Table 4 shows the influence of the content of element lanthanum in the first particles and the content of element lanthanum in the second particles of the positive electrode active material and the peak intensity ratio of the highest peak in the range of 23.0°-24.0° to the highest peak in the range of 32.5°-33.5° for the positive electrode active material on the impedance, cycling capacity retention rate, and high-temperature storage swelling rate of lithium-ion batteries. In Examples 69-86, two types of particle (first particles and second particles) were included, with the only difference from Example 65 being the parameters listed in Table 4.

TABLE 4

| | Percentage of element lanthanum in first particles, represented as E (wt %) | Percentage of element lanthanum in second particles, represented as F (wt %) | E/F | Peak intensity ratio of highest peak in 23.0°-24.0° to highest peak in 32.5°-33.5° | Rct (Ω) | High-temperature storage swelling rate | Cycling capacity retention rate |
|---|---|---|---|---|---|---|---|
| Example 65 | 0.10 | 0.07 | 1.4 | 1.1 | 0.254 | 21.8% | 79% |
| Example 69 | 0.005 | 0.01 | 0.5 | 1.2 | 0.302 | 25.4% | 70% |
| Example 70 | 0.01 | 0.01 | 1.0 | 1.2 | 0.297 | 24.3% | 72% |
| Example 71 | 0.01 | 0.005 | 2.0 | 1.1 | 0.341 | 26.7% | 68% |
| Example 72 | 0.05 | 0.08 | 0.6 | 1.3 | 0.185 | 17.6% | 84% |
| Example 73 | 0.10 | 0.15 | 0.7 | 1.2 | 0.159 | 17.1% | 87% |
| Example 74 | 0.30 | 0.50 | 0.6 | 1.1 | 0.157 | 15.1% | 88% |
| Example 75 | 0.50 | 0.80 | 0.6 | 1.0 | 0.156 | 14.8% | 86% |
| Example 76 | 0.60 | 0.90 | 0.7 | 1.2 | 0.189 | 19.1% | 82% |
| Example 77 | 0.70 | 1.00 | 0.7 | 0.9 | 0.265 | 25.2% | 75% |
| Example 78 | 0.50 | 0.30 | 1.7 | 1.0 | 0.242 | 24.1% | 75% |
| Example 79 | 0.10 | 0.12 | 0.8 | 0.5 | 0.254 | 21.7% | 79% |
| Example 80 | 0.10 | 0.13 | 0.8 | 0.6 | 0.170 | 18.7% | 83% |
| Example 81 | 0.10 | 0.14 | 0.7 | 0.8 | 0.183 | 17.3% | 84% |
| Example 82 | 0.10 | 0.15 | 0.7 | 1.0 | 0.155 | 14.2% | 85% |

TABLE 4-continued

|  | Percentage of element lanthanum in first particles, represented as E (wt %) | Percentage of element lanthanum in second particles, represented as F (wt %) | E/F | Peak intensity ratio of highest peak in 23.0°-24.0° to highest peak in 32.5°-33.5° | Rct (Ω) | High-temperature storage swelling rate | Cycling capacity retention rate |
|---|---|---|---|---|---|---|---|
| Example 83 | 0.10 | 0.16 | 0.6 | 1.3 | 0.165 | 14.9% | 89% |
| Example 84 | 0.10 | 0.17 | 0.6 | 1.5 | 0.173 | 19.3% | 84% |
| Example 85 | 0.10 | 0.19 | 0.5 | 1.7 | 0.359 | 29.7% | 73% |
| Example 86 | 0.10 | 0.25 | 0.4 | 1.7 | 0.362 | 30.2% | 72% |

The results show that having the percentage of element lanthanum in the first particles be 0.01 wt % to 0.6 wt % and the percentage of element lanthanum in the second particles be 0.01 wt % to 0.9 wt % in the positive electrode active material can further improve the impedance, high-temperature storage swelling rate, and cycling capacity retention rate of lithium-ion batteries under high-voltage operating conditions. The percentage (E wt %) of element lanthanum in the first particles and the percentage (F wt %) of element lanthanum in the second particles satisfying $0.5 \leq E/F < 1$ in the positive electrode active material can further improve the impedance, high-temperature storage swelling rate, and cycling capacity retention rate of lithium-ion batteries under high-voltage operating conditions.

With the peak intensity ratio of the highest peak in the range of 23.0°-24.0° to the highest peak in the range of 32.5°-33.5° for the positive electrode active material being in the range of 0.6 to 1.5, a more effective lanthanum-containing ionic conductor coating layer formed on the surface of the material can further optimize the impedance, high-temperature storage swelling rate, and cycling capacity retention rate of lithium-ion batteries under high-voltage operating conditions.

In this specification, reference to "an embodiment", "some embodiments", "one embodiment", "another example", "an example", "a specific example", or "some examples" means that at least one embodiment or example in this application includes a specific feature, structure, material, or characteristic described in this embodiment or example. Therefore, descriptions in various places throughout this specification, such as "in some embodiments", "in the embodiments", "in an embodiment", "in another example", "in an example", "in a specific example", or "examples" do not necessarily refer to the same embodiment or example in this application. In addition, a specific feature, structure, material, or characteristic herein may be combined in any appropriate manner in one or more embodiments or examples.

Although illustrative embodiments have been demonstrated and described, those skilled in the art should understand that the foregoing embodiments are not to be construed as limiting this application, and that some embodiments may be changed, replaced, and modified without departing from the spirit, principle, and scope of this application.

What is claimed is:

1. A positive electrode active material, wherein a surface region of the positive electrode active material comprises element aluminum; and based on the weight of the positive electrode active material, a percentage of the element aluminum in the surface region is A wt %, A is 0.01 to 0.5;

wherein the surface region of the positive electrode active material further comprises element lanthanum; and based on the weight of the positive electrode active material, a percentage of the element lanthanum in the surface region is B wt %, B is 0.01 to 0.8; and wherein an inner region of the positive electrode active material comprises element lanthanum; and based on the weight of the positive electrode active material, a percentage of the element lanthanum in the inner region is D wt %, D is 0.01 to 0.4, and $1 < B/D \leq 5$.

2. The positive electrode active material according to claim 1, wherein the inner region of the positive electrode active material comprises element aluminum; and based on the weight of the positive electrode active material, a percentage of the element aluminum in the inner region is $A_1$ wt %, $A_1$ satisfying at least one of the following conditions:
   (a) $A_1$ is 0.05 to 2;
   (b) $A_1 > A$; or
   (c) $1 < A_1/A < 10$.

3. The positive electrode active material according to claim 1, wherein $0.01 \leq B/A \leq 0.8$.

4. The positive electrode active material according to claim 1, wherein the surface region of the positive electrode active material further comprises at least one of elements lithium, cobalt, nickel, manganese, magnesium, titanium, zirconium, fluorine, or yttrium.

5. The positive electrode active material according to claim 1, wherein the positive electrode active material comprises first particles and second particles, and a median particle size of the first particles is greater than a median particle size of the second particles.

6. The positive electrode active material according to claim 5, wherein the positive electrode active material satisfies at least one of the following conditions:
   (i) the Dv50 of the first particles is 10 μm to 15 μm;
   (j) the Dv99 of the first particles is 20 μm to 30 μm;
   (k) the Dv50 and Dv99 of the first particles satisfying: $1.5 \leq Dv99/Dv50 < 3$;
   (l) the Dv50' of the second particles is 2 μm to 6 μm;
   (m) the Dv50 of the first particles and the Dv50' of the second particles satisfying: $2 \leq Dv50/Dv50' < 8$; or
   (n) the second particles comprise secondary particles, and a median particle size of primary particles forming the secondary particles is 0.1 μm to 3 μm.

7. The positive electrode active material according to claim 5, wherein a weight percentage of the element lanthanum in the first particles is less than a weight percentage of the element lanthanum in the second particles.

8. The positive electrode active material according to claim 5, wherein the weight percentage of the element lanthanum in the first particles is E wt %, and the weight percentage of the element lanthanum in the second particles is F wt %, wherein E is 0.01 to 0.6, and F is 0.01 to 0.9.

9. The positive electrode active material according to claim 8, wherein 0.5≤E/F<1.

10. The positive electrode active material according to claim 3, wherein in XRD test, a peak intensity ratio of the highest peak in the range of 23.0°-24.0° to the highest peak in the range of 32.5°-33.5° for the positive electrode active material is 0.6 to 1.5.

11. An electrochemical apparatus, comprising a positive electrode, a negative electrode, and an electrolyte, wherein the positive electrode comprises a positive electrode active material, wherein a surface region of the positive electrode active material comprises element aluminum; and based on the weight of the positive electrode active material, a percentage of the element aluminum in the surface region is A wt %, A is 0.01 to 0.5;

wherein the surface region of the positive electrode active material further comprises element lanthanum; and based on the weight of the positive electrode active material, a percentage of the element lanthanum in the surface region is B wt %, B is 0.01 to 0.8; and wherein an inner region of the positive electrode active material comprises element lanthanum; and based on the weight of the positive electrode active material, a percentage of the element lanthanum in the inner region is D wt %, D is 0.01 to 0.4, and 1<B/D≤5.

12. The electrochemical apparatus according to claim 11, wherein the inner region of the positive electrode active material comprises element aluminum; and based on the weight of the positive electrode active material, a percentage of the element aluminum in the inner region is $A_1$ wt %, A: satisfying at least one of the following conditions:
(a) $A_1$ is 0.05 to 2;
(b) $A_1$>A; or
(c) 1<$A_1$/A<10.

13. The electrochemical apparatus according to claim 11, wherein 0.01≤B/A≤0.8.

14. The electrochemical apparatus according to claim 11, wherein the positive electrode active material comprises first particles and second particles, and a median particle size of the first particles is greater than a median particle size of the second particles.

15. The electrochemical apparatus according to claim 14, wherein a weight percentage of the element lanthanum in the first particles is less than a weight percentage of the element lanthanum in the second particles.

16. The electrochemical apparatus according to claim 13, wherein in XRD test, a peak intensity ratio of the highest peak in the range of 23.0°-24.0° to the highest peak in the range of 32.5°-33.5° for the positive electrode active material is 0.6 to 1.5.

17. An electronic apparatus, comprising an electrochemical apparatus, the electrochemical apparatus comprises a positive electrode, a negative electrode, and an electrolyte, wherein the positive electrode comprises a positive electrode active material, wherein a surface region of the positive electrode active material comprises element aluminum; and based on the weight of the positive electrode active material, a percentage of the element aluminum in the surface region is A wt %, A is 0.01 to 0.5;

wherein the surface region of the positive electrode active material further comprises element lanthanum; and based on the weight of the positive electrode active material, a percentage of the element lanthanum in the surface region is B wt %, B is 0.01 to 0.8; and wherein an inner region of the positive electrode active material comprises element lanthanum; and based on the weight of the positive electrode active material, a percentage of the element lanthanum in the inner region is D wt %, D is 0.01 to 0.4, and 1<B/D≤5.

18. The electronic apparatus according to claim 17, wherein 0.01≤B/A≤0.8.

19. The elecrochemical apparatus according to claim 11, wherein 1<B/D≤5.

20. The electronic apparatus according to claim 17, A is 0.01 to 0.5.

* * * * *